United States Patent [19]
Parker

[11] 3,955,400
[45] May 11, 1976

[54] VISCOUS DAMPER AND METHOD FOR DETERMINING THE ROTATIONAL POSITION OF A WEIGHT THEREOF

[75] Inventor: William E. Parker, Chillicothe, Ill.

[73] Assignee: Caterpillar Tractor Co., Peoria, Ill.

[22] Filed: Aug. 27, 1973

[21] Appl. No.: 391,860

[52] U.S. Cl. .................................. 73/11; 74/574
[51] Int. Cl.² ............... G01P 13/00; G01M 19/00
[58] Field of Search .................. 73/12, 11, 432 R; 74/574; 188/1 B

[56] References Cited
UNITED STATES PATENTS

| | | | |
|---|---|---|---|
| 2,342,561 | 2/1944 | Trevaskis | 73/432 R |
| 2,505,636 | 4/1950 | Carter | 73/517 A X |
| 2,724,983 | 11/1955 | O'Connor | 74/574 |
| 3,006,695 | 10/1961 | Woodworth | 73/517 A |
| 3,426,204 | 2/1969 | Sutton | 250/303 X |

FOREIGN PATENTS OR APPLICATIONS

| | | | |
|---|---|---|---|
| 1,804,129 | 5/1970 | Germany | 73/516 R |
| 895,460 | 5/1962 | United Kingdom | 188/1 B |

*Primary Examiner*—James J. Gill
*Attorney, Agent, or Firm*—Phillips, Moore, Weissenberger Lempio & Strabala

[57] ABSTRACT

A viscous damper comprises an annular inertia weight rotatably mounted in a housing adapted for attachment to the crankshaft of an internal combustion engine. Position indicating means are formed on the weight to determine the rotational position thereof, relative to the housing. Such determination is made by marking the outside of the housing with an indicia in alignment with the position indicating means formed on the weight, rotating and subsequently stopping the housing, and measuring the misalignment, if any, occurring therebetween.

12 Claims, 4 Drawing Figures

Fig_1_

VISCOUS DAMPER AND METHOD FOR DETERMINING THE ROTATIONAL POSITION OF A WEIGHT THEREOF

BACKGROUND OF THE INVENTION

Viscous dampers comprise a housing secured to the crankshaft of an internal combustion engine, an inertia weight rotatably mounted in the housing and a viscous fluid retained between the weight and the housing to function as a damping and/or tuning medium. Seizing of the weight in the housing will ultimately damage the engine's crankshaft and attendant components, thus resulting in a costly overhaul of the engine. Such seizing normally occurs when the viscous fluid is heated to a sufficiently high temperature to change it to powder form.

SUMMARY OF THIS INVENTION

An object of this invention is to provide an economical and non-complex means and method for expeditiously determining the rotational position of a damper weight. The weight has position indicating means thereon, adapted to indicate the rotational position thereof relative to a housing having the weight rotatably mounted therein. The method of this invention comprises the steps of: Premarking the weight with such means; Marking the outside of the housing with indicia in alignment with the position indicating means; Rotating and subsequently stopping the housing; and Measuring the misalignment, if any, occurring between the position indicating means and the indicia.

BRIEF DESCRIPTION OF THE DRAWINGS

Other objects of this invention will become apparent from the following description and accompanying drawings wherein.

DETAILED DESCRIPTION

Figure 1:
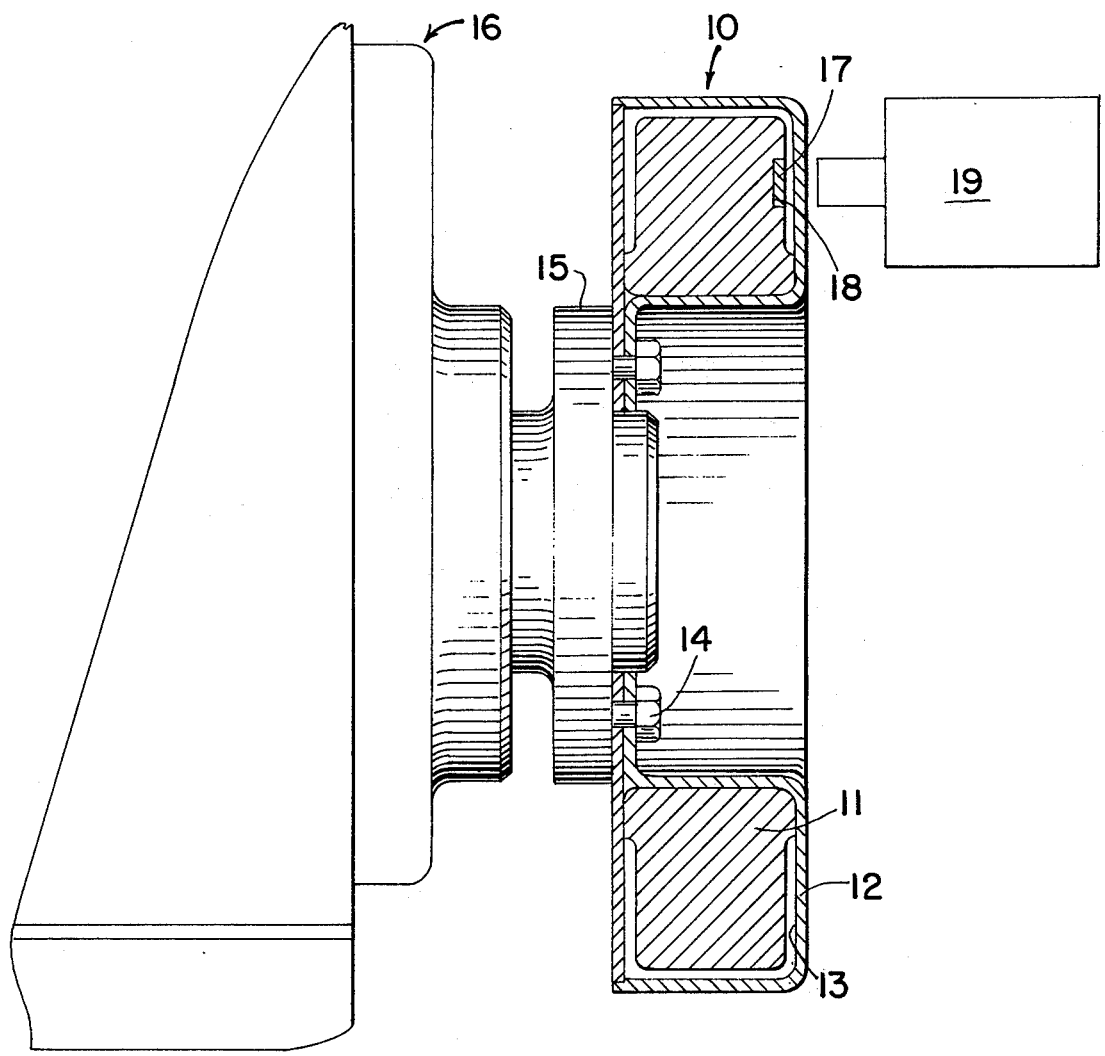
FIG. 1 is a sectioned side elevational view of a viscous damper attached to a crankshaft of an internal combustion engine with a position detecting means mounted thereby.

FIG. 1 discloses a viscous damper 10 which may comprise the type of damper disclosed in U.S. Pat. No. 3,512,612. The damper essentially comprises an annular weight 11 rotatably mounted in a closed housing 12. An annular chamber 13 is defined between the weight and the housing to retain a viscous fluid, such as silicone, therein to provide the required tuning and/or damping desiderata.

The housing is secured by bolts 14 to an end of a crankshaft 15 of an internal combustion engine 16. In conventional practice, it is necessary to remove the damper from the engine to test its operativeness, i.e., whether or not the viscous fluid has changed to powder form to seize the weight in the housing. The hereinafter described invention makes such testing possible without having to remove the damper from the engine.

Figure 2:
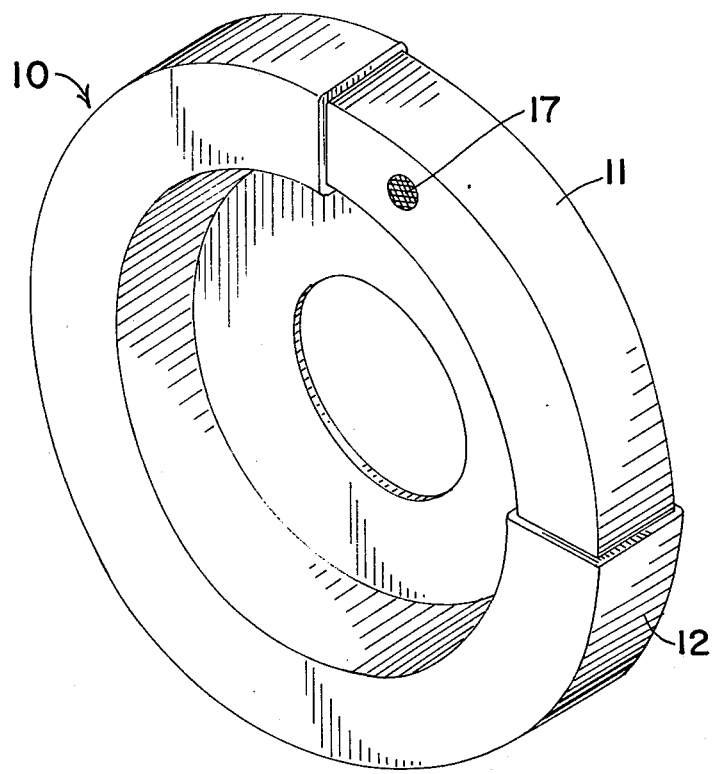
FIG. 2 is an isometric view of the viscous damper.

As shown in FIGS. 1 and 2, a position indicating means 17, preferably in the form of a small circular patch disposed in a like-shaped recess 18, is secured on the weight to indicate the rotational position thereof relative to the housing. The patch may comprise a radio-active or magnetic material which is sensitive to a conventional detecting means 19, such as an electromagnetic pick-up system. An X-ray scanner could also be used as the detecting means to visually detect the rotative position of the patch. It should be understood that the patch may be secured on any one of the four sides of the inertia weight, although positioning thereof on the outboard side of the inertia weight, as shown, affords a more accessible position for detection purposes.

Figure 3:
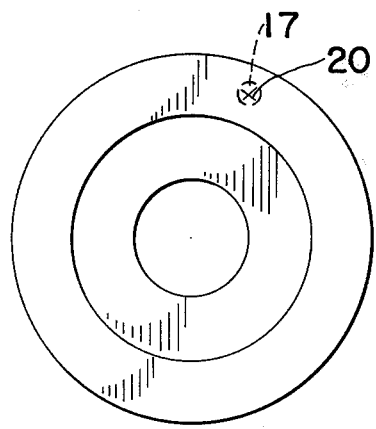
FIGS. 3 and 4 are reduced front elevational views depicting the damper during a method for determining the relative position of a weight rotatably mounted therein.
Figure 4:
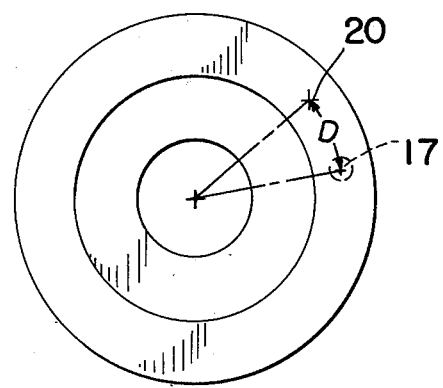

The operativeness of the crankshaft mounted damper can be tested by locating patch 17 by use of detecting means 19 and marking the outside of the housing with indicia 20, in alignment with patch 17, as shown in FIG. 3. The engine is then run to rotate the damper over a predetermined time period. Upon stopping of the engine, misalignment occurring between the housing and weight can be detected by detecting means 19 which will "spot" the relative rotational position of patch 17.

Misalignment through a circumferential distance D, for example, will normally indicate that the damper is functioning properly to provide the desired damping and/or tuning functions. Also, such variance along with other testing parameters, such as engine speed, and related design parameters for the damper (e.g., viscosity of the damping fluid, the working clearances between the weight and housing, etc.), may be used to determined the degree of damping and/or tuning. An at least substantial superimposition of indicia 20 over patch 17 after the engine has been run is indicative that the weight has seized in the housing and that the damper has thus been rendered inoperative.

What is claimed is:

1. A torsional vibration engine damper adapted for attachment to the crankshaft of an internal combustion engine comprising
   a closed annular housing,
   an inertia weight freely rotatably mounted in and relative to said housing in unattached relationship therewith and defining clearances therebetween adapted to retain a damping fluid therein and
   indicia means on said weight for indicating the rotational position thereof relative to a specific location on said housing.

2. The damper of claim 1 wherein said damper is attached to a crankshaft of an internal combustion engine.

3. The damper of claim 1 further comprising a viscous silicone fluid retained in said housing between said weight and said housing.

4. The damper of claim 1 wherein said indicia means constitutes a small patch of material secured on said weight.

5. The damper of claim 4 wherein said patch constitutes a radio-active material.

6. The damper of claim 4 wherein said patch constitutes a magnetic material.

7. The damper of claim 4 wherein said patch is positioned on an outboard side of said weight.

8. A method for determining the rotational position of a weight rotatably mounted in a closed opaque housing of a damper comprising the steps of
   placing first indicia on said weight,
   first sensing the rotational position of said first indicia, marking the outside of said housing with second indicia to indicate the relative rotational position of said first indicia, rotating and stopping said housing, and second sensing the relative rotational positions of said first and second indicia to note any misalignment therebetween.

9. The method of claim 8 further comprising the step of attaching said damper to a crankshaft of an internal combustion engine prior to the steps of rotating and stopping said housing.

10. The method of claim 8 wherein said placing step comprises securing a patch of radio-active material on said weight.

11. The method of claim 8 wherein said placing step comprises securing a patch of magnetic material on said weight.

12. The method of claim 8 wherein said second sensing step comprises positioning a detecting means adjacent to an outboard side of said damper.

* * * * *